(12) United States Patent
Chang

(10) Patent No.: US 6,689,300 B2
(45) Date of Patent: Feb. 10, 2004

(54) METHOD OF INTEGRALLY FORMING SHOE WITH MULTIPLE MATERIAL

(75) Inventor: Kuo-Hsiang Chang, Taichung Hsien (TW)

(73) Assignee: Mao-Cheng Tsai, Taichung (TW)

( * ) Notice: Subject to any disclaimer, the term of this patent is extended or adjusted under 35 U.S.C. 154(b) by 386 days.

(21) Appl. No.: 09/818,679

(22) Filed: Mar. 28, 2001

(65) Prior Publication Data

US 2002/0140129 A1 Oct. 3, 2002

(51) Int. Cl.⁷ ................................................ B29C 45/16
(52) U.S. Cl. ...................... 264/244; 264/255; 264/275; 264/279; 264/328.7; 264/425; 264/129.2; 264/12; 264/142 RS
(58) Field of Search ................................ 264/244, 255, 264/275, 279, 328.7; 425/129.2; 12/142 RS

(56) References Cited

U.S. PATENT DOCUMENTS

| | | | | |
|---|---|---|---|---|
| 3,429,960 A | * | 2/1969 | Feather | 264/245 |
| 3,958,291 A | * | 5/1976 | Spier | 12/142 RS |
| 4,302,416 A | * | 11/1981 | Rudolf et al. | 264/244 |
| 4,556,191 A | * | 12/1985 | Mangogna | 249/119 |
| 4,886,238 A | * | 12/1989 | Davis | 249/83 |
| 5,193,240 A | * | 3/1993 | Salpietro | 12/146 B |
| 5,433,022 A | * | 7/1995 | Lo et al. | 36/30 R |
| 5,667,738 A | * | 9/1997 | Krajcir | 264/45.5 |
| 6,000,923 A | * | 12/1999 | Lo | 425/112 |
| 6,416,610 B1 | * | 7/2002 | Matis et al. | 156/245 |

FOREIGN PATENT DOCUMENTS

GB 2255308 A * 11/1992

* cited by examiner

*Primary Examiner*—Edmund H. Lee
(74) *Attorney, Agent, or Firm*—Bacon & Thomas, PLLC

(57) ABSTRACT

A method of integrally forming shoe with multiple material employs a set of molds which include a lower mold, a middle mold and an upper mold. The lower and middle mold have respectively a lower cavity and a middle cavity. The method includes the steps of: blending, melting and injecting, secondary injecting, positioning and pouring. The contact surface of the outsole will be melted slightly when a coupling agent is injected thereby to bond the TPU and outsole made from rubber. A vamp may be placed over the middle mold to receive the PU for forming a midsole thereby to enable the vamp, midsole and lower sole formed integrally.

1 Claim, 6 Drawing Sheets

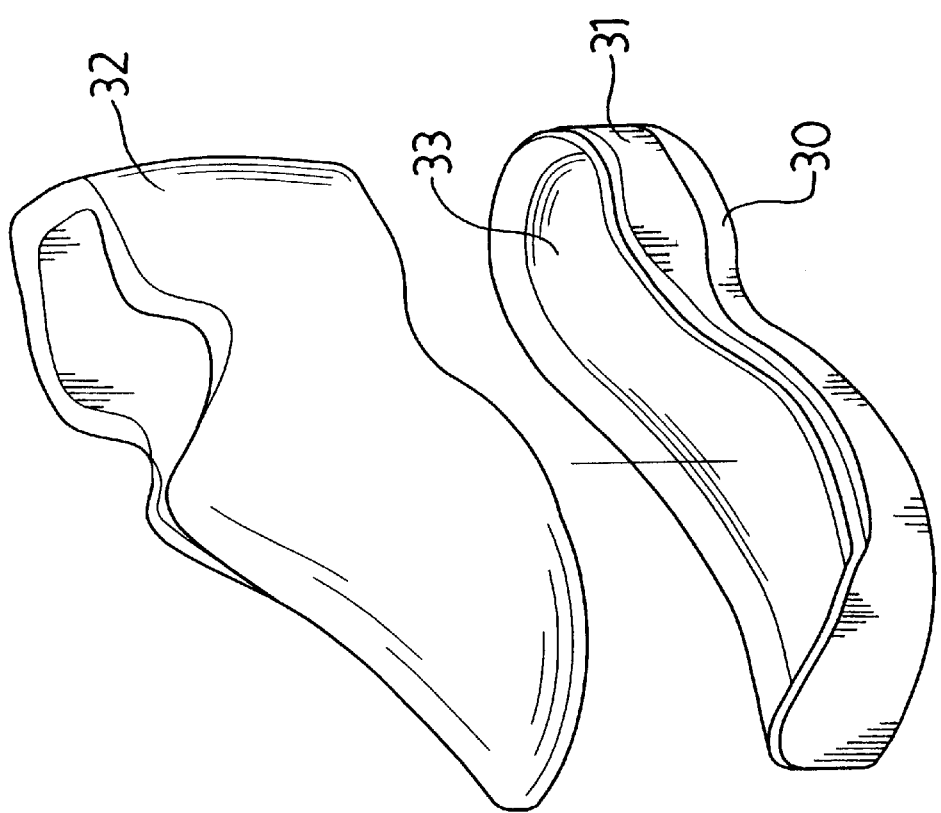

METHOD OF INTEGRALLY FORMING SHOE WITH MULTIPLE MATERIAL

BACKGROUND OF THE INVENTION

This invention relates to a method of making shoe and particularly a method that uses multiple material to form shoe integrally.

A conventional shoe generally includes an outsole 1, a lower sole 2, and a midsole 3 and other parts. The fabrication method of shoe generally includes the steps of: forming individual parts by injection molding process, manually coating adhesive (such as a strong bonding adhesive) on the contact surfaces, using a compression machine to compress the bonding parts, adhering the parts through the adhesive, and stitching a vamp (4) to the sole to form the finished shoe. It is a lengthy and tedious process (such as shown in FIG. 1). Moreover the shoes being made are prone to fall apart or rupture. In order to improve shoe quality, some shoe producers use rubber which has better wearing resistance and anti-slippery property to make the outsole (1) and Thermo Plastic Poly Urethane (TPU) which has excellent elastic tensile strength to make the lower sole (2). However up to present, there is still no technique available for bonding the rubber and TPU as they have a lot of different material characteristics. This becomes a big problem to the shoe producers.

How to develop a method for bonding rubber and TPU so that the outsole (1), lower sole (2), midsole (3) and vamp (4) may be integrally formed for saving time and cost is one of the critical issues in the shoe industry.

SUMMARY OF THE INVENTION

It is therefore an object of this invention to provide a method for integrally forming the outsole, lower sole, midsole and vamp thereby to save production cost and time.

Another object of this invention is to use a coupling agent for bonding the outsole made from rubber and lower sole made from TPU thereby to produce a shoe that has greater wearing resistance, anti-slippery and elastic tensile strength.

To attain aforesaid objects, the method of this invention employs mating molds which have a lower cavity and a middle cavity. The fabrication process includes the steps of blending, melting and injecting, secondary injecting, positioning and pouring. And a coupling agent is added to complete the process.

By means of aforesaid process, when the TPU is being injected, the bottom contact surface of the sole is slightly melted for bonding the TPU and the sole made from the rubber, then the vamp is disposed over the midsole and PU is poured onto the vamp to form the midsole, thereby the vamp is integrally formed with the midsole, lower sole and outsole.

BRIEF DESCRIPTION OF THE DRAWINGS

The invention, as well as its many advantages, may be further understood by the following detailed description and drawings, in which:

FIG. 4 is an exploded view of the vamp, lower sole and outsole according to this invention.

DETAILED DESCRIPTION OF THE PREFERRED EMBODIMENT

Figure 1:
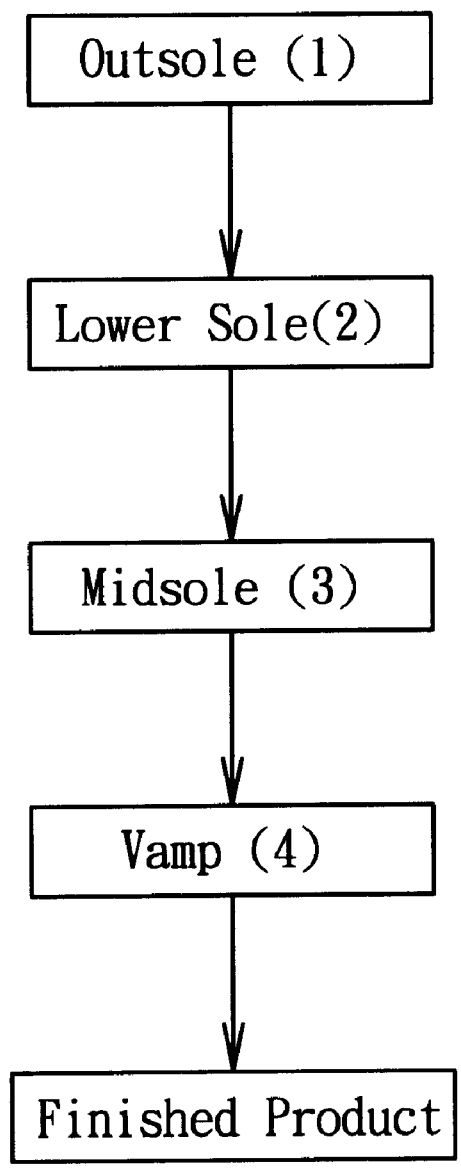
FIG. 1 is a conventional production flow for making shoe.
Figure 2:
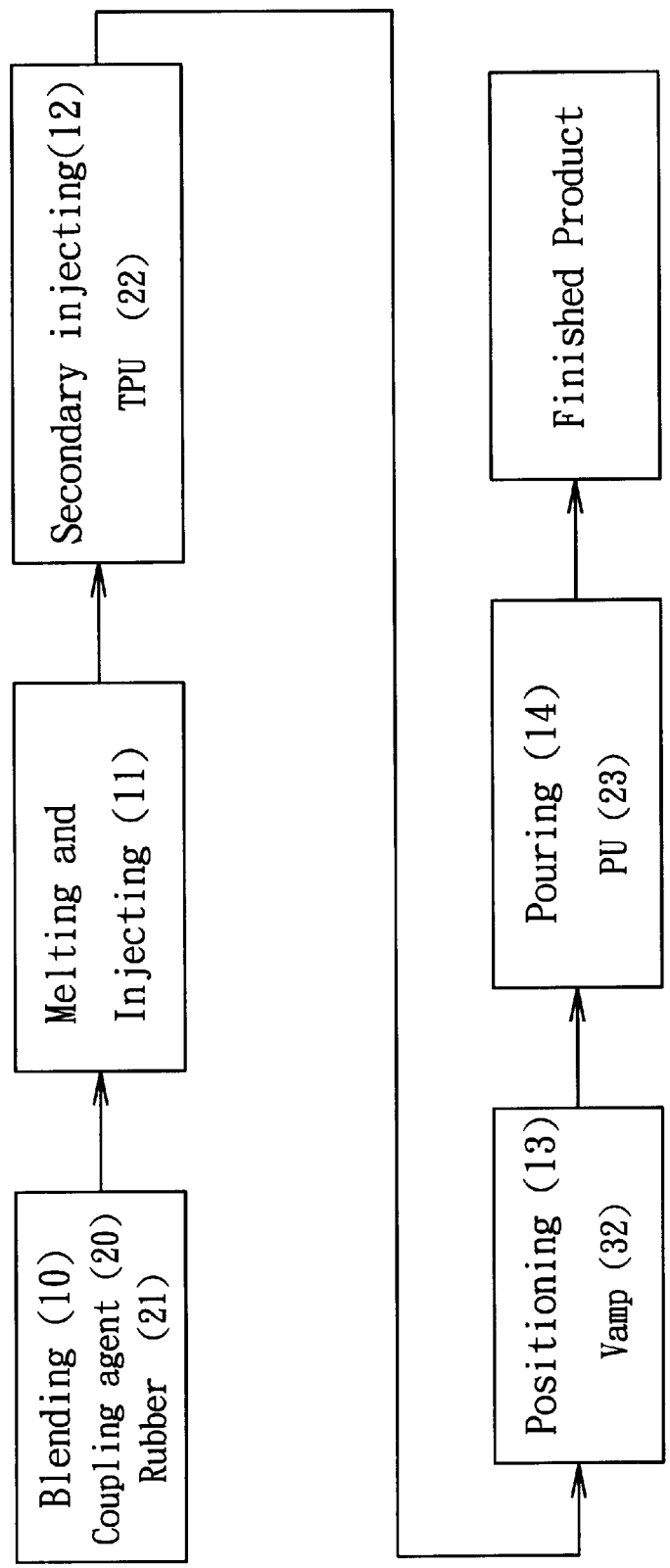
FIG. 2 is a production flow of this invention.
Figure 3A:
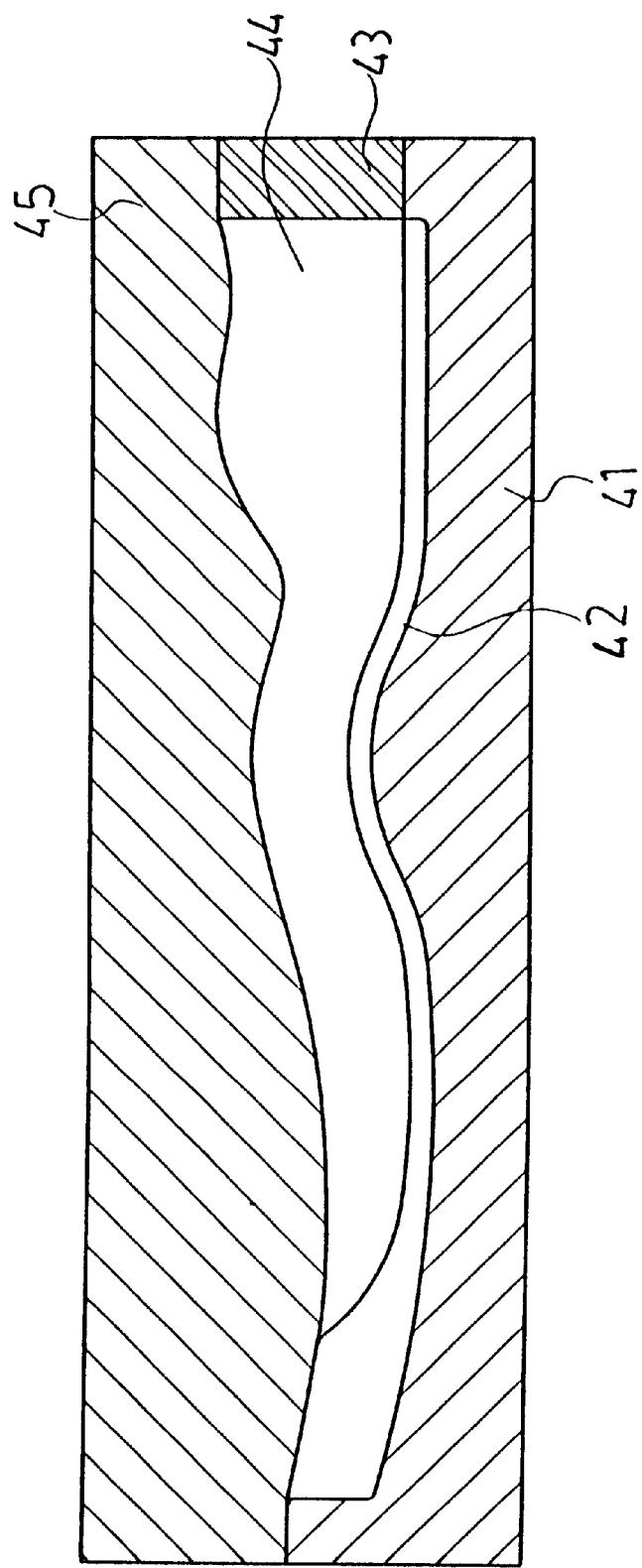
FIG. 3A is a schematic sectional view of the molds for this invention.
Figure 3B:
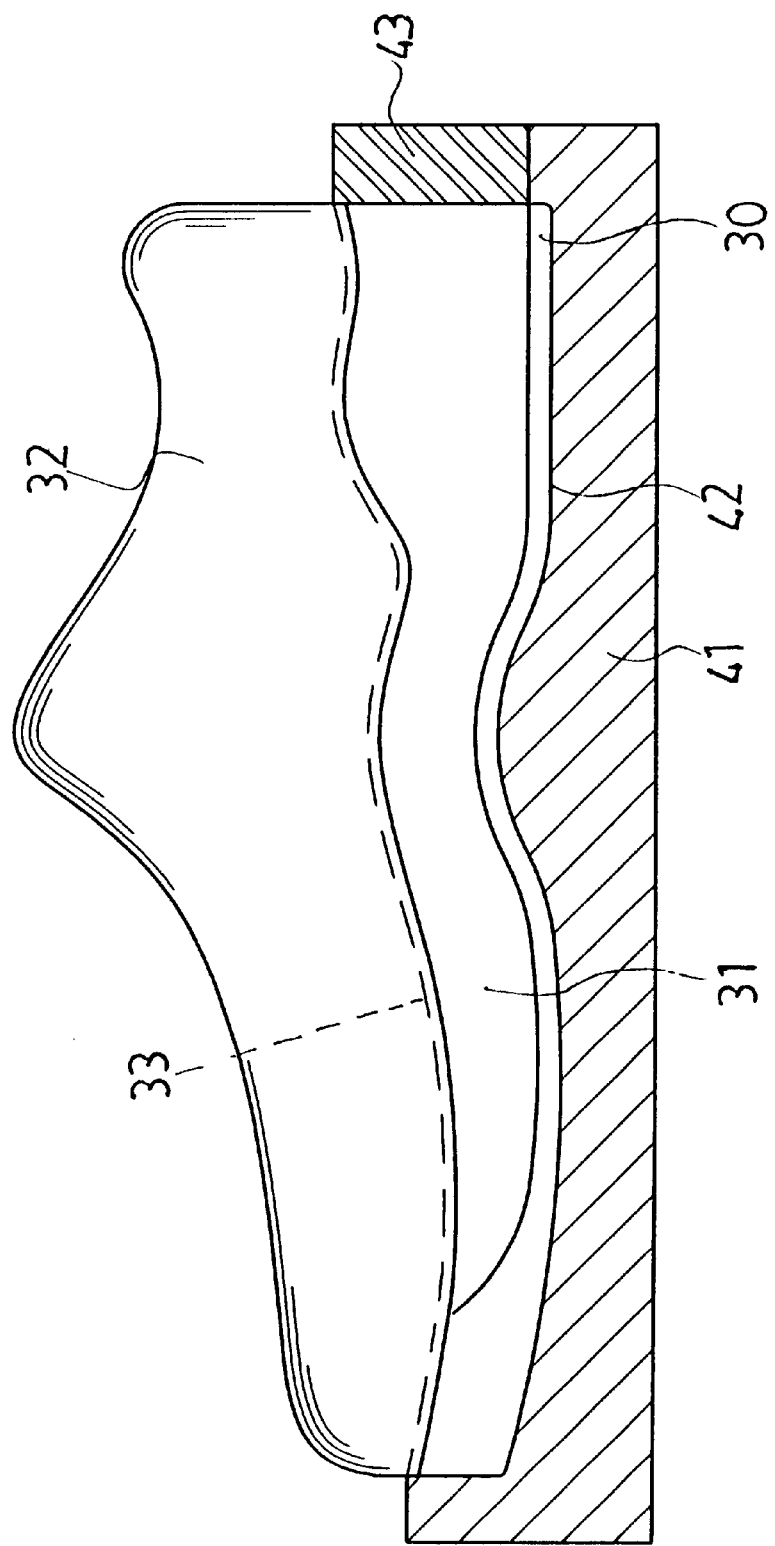
FIG. 3B is a schematic sectional view of the molds in use according to FIG. 3A.
Figure 5:
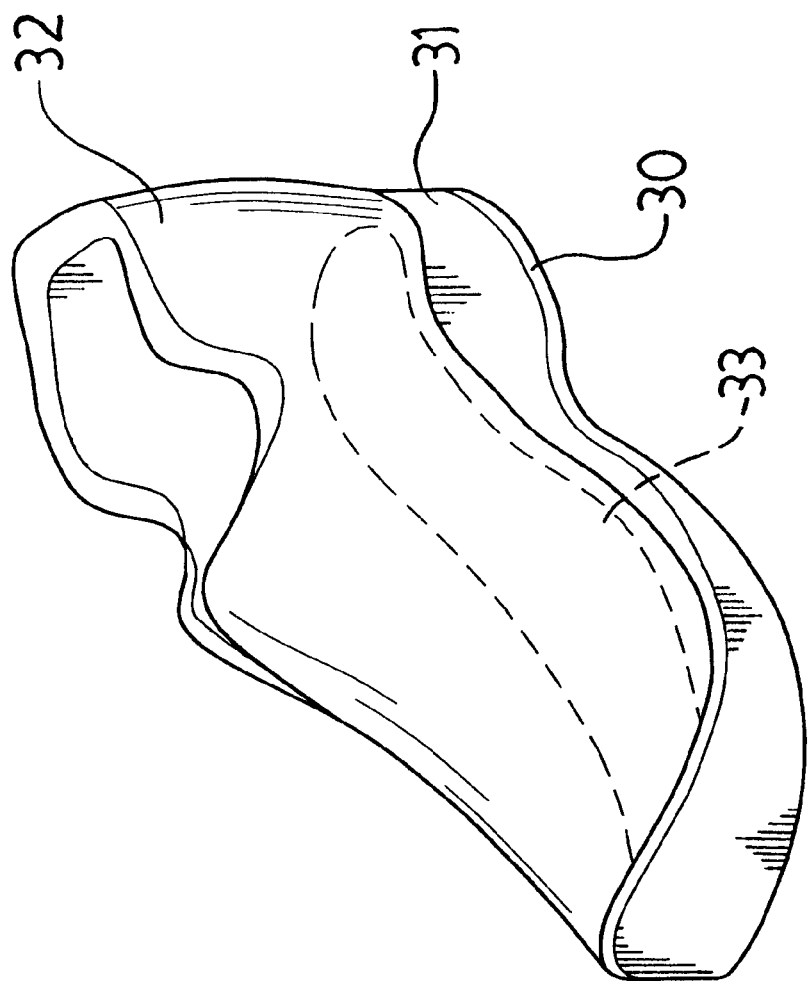
FIG. 5 is a perspective view of the vamp, lower sole and outsole bonded together according to this invention.

Referring to FIGS. 2 through 5, the method of this invention uses a plurality of mating molds for forming shoe. The molds include a lower mold 41, a middle mold 43 and an upper mold 45. In the lower and middle molds 41 and 43, there are respectively a lower cavity 42 and a middle cavity 44.

The fabrication method of this invention includes the following steps:

Blending 10: blend evenly a selected coupling agent 20 by a selected proportion into rubber material 21.

Melting and injecting 11: melt the rubber 21 which contains the coupling agent 20, and inject the melted rubber 21 and coupling agent 20 into the lower cavity 42 to form an outsole 30.

Secondary injecting 12: melt and inject TPU 22 into the middle cavity 44 which already has the outsole 30 located therein. As the outsole 30 has the coupling agent 20 covering thereon, the contact surface of the outsole 30 will be melted slightly when the TPU 22 is injected. The coupling agent 20 will generate reaction to bond the TPU 22 and outsole 30 thereby to form a lower sole 31 above the outsole 30.

Positioning 13: remove the upper mold 45, and place a vamp 32 over the middle mold 43.

Pouring 14: pour PU 23 into the vamp 32 to form a midsole 33.

By means of aforesaid processes, including blending 10, melting and injecting 11, secondary injecting 12, positioning 13 and pouring 14, blend the coupling agent in the rubber 21 and melt, inject into the lower cavity 42 to form the outsole 30, inject TPU 22 into the middle cavity 44 for the coupling agent 20 to generate reaction for melting and bonding the TPU 22 with the outsole 30 made from rubber to form the outsole 30 and lower sole 31, finally remove the upper mold 45 and place the preset vamp 32 over the middle mold 43, and pour PU 23 into the vamp 32 to form the midsole 33, thereby to form the finished product.

As this invention uses the coupling agent 20 which enables contact surface of the outsole 30 melting slightly when TPU 22 is injected and for the coupling agent 20 to generate reaction thereby to enable the outsole 30 made from rubber and TPU 22 melted and bonded together to integrally form the outsole 30 and lower sole 31.

Another advantage of this invention is that the vamp 32 may be placed over the middle mold 43 to receive the PU 23 for forming the midsole 33 thereby to enable the vamp 32, midsole 33 and lower sole 31 formed integrally.

What is claimed is:

1. A method of integrally forming a shoe with multiple material which comprises the steps of:

assembling a lower mold, a middle mold and an upper mold to form an assembly wherein said lower and middle mold has respectively a lower cavity and a middle cavity;

blending evenly a selected proportion of a selected coupling agent into rubber material to form a blend containing said rubber and coupling agent;

melting said blend to form a melted blend and injecting said melted blend into said lower cavity to form an outsole;

secondary injecting melted TPU into said middle cavity which already has said outsole located therein to form a lower sole above the outsole;

removing the upper mold from said assembly and positioning a vamp over said middle mold, and pouring PU into the vamp to form a midsole.

* * * * *